US007825201B2

(12) United States Patent
Luo et al.

(10) Patent No.: US 7,825,201 B2
(45) Date of Patent: *Nov. 2, 2010

(54) PROCESS FOR PRODUCING POLYDIENES

(75) Inventors: Steven Luo, Copley, OH (US); Kevin M. McCauley, Coventry Township, OH (US); Jason T. Poulton, Akron, OH (US)

(73) Assignee: Bridgestone Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/490,457

(22) Filed: Jun. 24, 2009

(65) Prior Publication Data

US 2009/0299019 A1  Dec. 3, 2009

Related U.S. Application Data

(63) Continuation-in-part of application No. 11/967,549, filed on Dec. 31, 2007.

(51) Int. Cl.
C08F 4/52 (2006.01)
C08F 2/02 (2006.01)
C08F 136/06 (2006.01)

(52) U.S. Cl. ............... 526/137; 526/142; 526/144; 526/153; 526/164; 526/209; 526/902

(58) Field of Classification Search .......... 526/137, 526/144, 340.4, 153, 164, 209, 902, 142
See application file for complete search history.

(56) References Cited

U.S. PATENT DOCUMENTS

| 3,297,667 | A | | 1/1967 | von Dohlen et al. |
| 3,541,063 | A | | 11/1970 | Throckmorton et al. |
| 3,794,604 | A | | 2/1974 | Throckmorton et al. |
| 4,429,089 | A | | 1/1984 | Pedretti |
| 4,461,883 | A | * | 7/1984 | Takeuchi et al. ............ 526/139 |
| 4,663,405 | A | | 5/1987 | Throckmorton |
| 4,696,984 | A | | 9/1987 | Carbonaro et al. |
| 4,710,553 | A | | 12/1987 | Carbonaro et al. |
| 4,736,001 | A | | 4/1988 | Carbonaro et al. |
| 4,906,706 | A | | 3/1990 | Hattori et al. |
| 4,931,376 | A | | 6/1990 | Ikematsu |
| 4,990,573 | A | | 2/1991 | Andreussi et al. |
| 5,021,379 | A | * | 6/1991 | Martin et al. ............... 502/102 |
| 5,064,910 | A | | 11/1991 | Hattori et al. |
| 5,567,784 | A | | 10/1996 | Wieder et al. |
| 5,844,050 | A | | 12/1998 | Fukahori et al. |
| 6,136,931 | A | | 10/2000 | Jang et al. |
| 6,197,713 | B1 | * | 3/2001 | Lynch ...................... 502/102 |
| 6,699,813 | B2 | * | 3/2004 | Luo et al. ................. 502/119 |
| 6,759,497 | B2 | | 7/2004 | Grün et al. |
| 6,838,526 | B1 | | 1/2005 | Sone et al. |
| 6,977,281 | B1 | | 12/2005 | Ozawa et al. |
| 6,992,147 | B1 | | 1/2006 | Ozawa et al. |
| 7,008,899 | B2 | | 3/2006 | Luo et al. |
| 7,094,849 | B2 | | 8/2006 | Luo et al. |
| 7,148,299 | B2 | * | 12/2006 | Kaita et al. ............... 526/164 |
| 7,294,680 | B2 | | 11/2007 | Sone et al. |
| 7,351,776 | B2 | | 4/2008 | Tartamella et al. |
| 2002/0119889 | A1 | | 8/2002 | Kaita |
| 2005/0131174 | A1 | | 6/2005 | Luo et al. |
| 2006/0004131 | A1 | | 1/2006 | Ozawa et al. |
| 2006/0025539 | A1 | | 2/2006 | Ozawa et al. |
| 2006/0030677 | A1 | | 2/2006 | Ozawa et al. |
| 2007/0149717 | A1 | | 6/2007 | Luo et al. |
| 2007/0276122 | A1 | | 11/2007 | Luo |
| 2008/0051552 | A1 | | 2/2008 | Luo et al. |
| 2008/0076890 | A1 | | 3/2008 | Tartamella et al. |
| 2008/0146745 | A1 | | 6/2008 | Luo et al. |
| 2008/0182954 | A1 | | 7/2008 | Luo |

FOREIGN PATENT DOCUMENTS

| EP | 1939221 A2 | 7/2008 |
| GB | 2101616 A | 1/1983 |
| JP | 05-051406 A | 3/1993 |
| JP | 05-059103 A | 3/1993 |
| JP | 10-306113 A | 11/1998 |
| JP | 11-035633 A | 2/1999 |

OTHER PUBLICATIONS

Kaita et al, Stereospecific Polymerization of 1,3-Butadiene with Samarocene-Based Catalysts, Macromolecules, 1999, 32, 9078-9079.*
Z. Shen, J. Ouyang, F. Wang, Z. Hu, F. Yu, and B. Qian, Journal of Polymer Science: Polymer Chemistry Edition, 1980, vol. 18, pp. 3345-3357.
H. L. Hsieh, H. C. Yeh, Rubber Chemistry and Technology, 1985, vol. 58, pp. 117-145.
D. J. Wilson, Journal of Polymer Science, Part A, Polymer Chemistry, 1995, vol. 33, pp. 2505-2513.
R. P. Quirk, A. M. Kells, Polymer International, 2000, vol. 49, pp. 751-756.
J-H Yang, M. Tsutsui, Z. Chen, D. E. Bergbreiter, Macromolecules, 1982, vol. 15, pp. 230-233.
Office Action for U.S. Appl. No. 11/964,848, Luo, et al., "Method for Producing Functionalized cis-1,4-Polydienes Having High ci-1,4-Linkage Content and High Functionality.".
Kaita et al, Stereospecific Polymerization of 1,3-Butadiene with Samarocene-Based Catalysts, Macromolecules, 1999, 32, 9078-9079.
European Search Report, European Application No. 08254180, dated Jul. 9, 2009.

* cited by examiner

*Primary Examiner*—Fred M Teskin
(74) *Attorney, Agent, or Firm*—Meredith E. Hooker; Arthur Reginelli

(57) ABSTRACT

A process for preparing a polydiene, the process comprising the step of polymerizing conjugated diene monomer in the presence of a dihydrocarbyl ether, where said step of polymerizing takes place within a polymerization mixture that includes less than 20% by weight of organic solvent based on the total weight of the polymerization mixture, and where said step of polymerizing employs a lanthanide-based catalyst system that includes the combination of or reaction product of ingredients including (a) a lanthanide compound, (b) an aluminoxane, (c) an organoaluminum compound other than an aluminoxane, and (d) a bromine-containing compound selected from the group consisting of elemental bromine, bromine-containing mixed halogens, and organic bromides.

44 Claims, No Drawings

PROCESS FOR PRODUCING POLYDIENES

This application is a Continuation-In-Part of U.S. application Ser. No. 11/967,549, filed Dec. 31, 2007, which is incorporated herein by reference.

FIELD OF THE INVENTION

One or more embodiments of the present invention are directed toward a process for producing polydienes.

BACKGROUND OF THE INVENTION

Polydienes may be produced by solution polymerization, wherein conjugated diene monomer is polymerized in an inert solvent or diluent. The solvent serves to solubilize the reactants and products, to act as a carrier for the reactants and product, to aid in the transfer of the heat of polymerization, and to help in moderating the polymerization rate. The solvent also allows easier stirring and transferring of the polymerization mixture (also called cement), since the viscosity of the cement is decreased by the presence of the solvent. Nevertheless, the presence of solvent presents a number of difficulties. The solvent must be separated from the polymer and then recycled for reuse or otherwise disposed of as waste. The cost of recovering and recycling the solvent adds greatly to the cost of the polymer being produced, and there is always the risk that the recycled solvent after purification may still retain some impurities that will poison the polymerization catalyst. In addition, some solvents such as aromatic hydrocarbons can raise environmental concerns. Further, the purity of the polymer product may be affected if there are difficulties in removing the solvent.

Polydienes may also be produced by bulk polymerization (also called mass polymerization), wherein conjugated diene monomer is polymerized in the absence or substantial absence of any solvent, and, in effect, the monomer itself acts as a diluent. Since bulk polymerization is essentially solventless, there is less contamination risk, and the product separation is simplified. Bulk polymerization offers a number of economic advantages including lower capital cost for new plant capacity, lower energy cost to operate, and fewer people to operate. The solventless feature also provides environmental advantages, with emissions and waste water pollution being reduced.

Despite its many advantages, bulk polymerization requires very careful temperature control, and there is also the need for strong and elaborate stirring equipment since the viscosity of the polymerization mixture can become very high. In the absence of added diluent, the high cement viscosity and exotherm effects can make temperature control very difficult. Consequently, local hot spots may occur, resulting in degradation, gelation, and/or discoloration of the polymer product. In the extreme case, uncontrolled acceleration of the polymerization rate can lead to disastrous "runaway" reactions. To facilitate the temperature control during bulk polymerization, it is desirable that a catalyst gives a reaction rate that is sufficiently fast for economical reasons but is slow enough to allow for the removal of the heat from the polymerization exotherm in order to ensure the process safety.

Lanthanide-based catalyst systems that comprise a lanthanide compound, an alkylating agent, and a halogen source are known to be useful for producing conjugated diene polymers having high cis-1,4-linkage contents. The resulting cis-1,4-polydienes typically have a cis-1,4-linkage of less than 99%. Molecular weight distributions vary, but are typically above 2. It is known that cis-1,4-polydienes having higher cis contents, and narrower molecular weight distributions, give a greater ability to undergo strain-induced crystallization and lower hysteresis and thus, give superior physical properties such as higher tensile strength and higher abrasion resistance. Therefore, there is a need to develop a process for producing cis-1,4-polydienes having a combination of ultra-high cis contents (greater than 99% cis) and narrow molecular weight distributions.

Unfortunately, most catalyst systems can not consistently achieve all of these properties. For example, catalysts have been developed to produce polymers with cis-1,4-linkage contents above 99%, but have broad molecular weight distributions. Furthermore, many of these catalysts use highly active, Lewis acidic chlorides, bromides, and iodides to achieve these properties, which results in excessively fast polymerization rates. This makes it very difficult to control the temperature and compromises the process safety. Fast polymerization rates and uncontrollable temperatures often lead to gel formation inside the polymerization reactor due to excess polymer formation on the walls of the reactor. In turn, the reactor must be cleaned before another polymerization can be conducted resulting in expensive delays in production.

Therefore, it is desirable to develop a bulk polymerization method for producing cis-1,4-polydienes having higher cis-1,4-linkage content and lower molecular weight distribution.

SUMMARY OF THE INVENTION

One or more embodiments of the present invention provide a process for preparing a polydiene, the process comprising the step of polymerizing conjugated diene monomer in the presence of a dihydrocarbyl ether, where said step of polymerizing takes place within a polymerization mixture that includes less than 20% by weight of organic solvent based on the total weight of the polymerization mixture, and where said step of polymerizing employs a lanthanide-based catalyst system that includes the combination of or reaction product of ingredients including (a) a lanthanide compound, (b) an aluminoxane, (c) an organoaluminum compound other than an aluminoxane, and (d) a bromine-containing compound selected from the group consisting of elemental bromine, bromine-containing mixed halogens, and organic bromides.

Still other embodiments of the present invention provide a process for preparing a polydiene, the process comprising the step of introducing conjugated diene monomer with a lanthanide-based catalyst system in the presence of less than about 20% by weight organic solvent based on the total weight of the polymerization mixture, where the lanthanide-based catalyst system includes the combination of or reaction product of ingredients including (a) a lanthanide compound, (b) an aluminoxane, (c) an organoaluminum compound other than an aluminoxane, (d) a bromine-containing compound selected from the group consisting of elemental bromine, bromine-containing mixed halogens, and organic bromides, and (e) a dihydrocarbyl ether.

Still other embodiments of the present invention provide a process for preparing a polydiene, the process comprising the step of introducing (a) a lanthanide compound, (b) an aluminoxane, (c) an organoaluminum compound other than an aluminoxane, (d) a bromine-containing compound selected from the group consisting of elemental bromine, bromine-containing mixed halogens, hydrogen bromide, and organic bromides, (e) a dihydrocarbyl ether, and (f) conjugated diene monomer, where said step of introducing forms a polymerization mixture that includes less than 20% by weight of solvent based on the total weight of the polymerization mixture.

Still other embodiments of the present invention provide a cis-1,4-polydiene having a cis-1,4-linkage content of greater than 99% and a molecular weight distribution of less than 2.0.

DETAILED DESCRIPTION OF ILLUSTRATIVE EMBODIMENTS

According to one or more embodiments of the present invention, polydienes are produced by bulk polymerization of conjugated diene monomer with a lanthanide-based catalyst system that is the combination of or reaction product of (a) a lanthanide compound, (b) an aluminoxane, (c) an organoaluminum compound other than an aluminoxane, (d) a bromine-containing compound selected from the group consisting of elemental bromine, bromine-containing mixed halogens, and organic bromides, and (e) a dihydrocarbyl ether. Without wishing to be bound by any particular theory, it is believed that these catalyst ingredients synergistically yield a polydiene product with advantageous cis-1,4 content and an overall balance of advantageous properties. Further, it has been unexpectedly discovered that by including an iodine-containing compound as an additional catalyst ingredient, the molecular weight distribution can advantageously be improved without a deleterious impact on the other properties.

In one or more embodiments, examples of conjugated diene monomer that can be polymerized according to the present invention include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Mixtures of two or more conjugated dienes may also be utilized in copolymerization.

Various lanthanide compounds or mixtures thereof can be employed. In one or more embodiments, these compounds may be soluble in hydrocarbon solvents such as aromatic hydrocarbons, aliphatic hydrocarbons, or cycloaliphatic hydrocarbons. In other embodiments, hydrocarbon-insoluble lanthanide compounds, which can be suspended in the polymerization medium to form the catalytically active species, are also useful.

Lanthanide compounds may include at least one atom of lanthanum, neodymium, cerium, praseodymium, promethium, samarium, europium, gadolinium, terbium, dysprosium, holmium, erbium, thulium, ytterbium, lutetium, and didymium. Didymium may include a commercial mixture of rare-earth elements obtained from monazite sand.

The lanthanide atom in the lanthanide compounds can be in various oxidation states including but not limited to the 0, +2, +3, and +4 oxidation states. Lanthanide compounds include, but are not limited to, lanthanide carboxylates, lanthanide organophosphates, lanthanide organophosphonates, lanthanide organophosphinates, lanthanide carbamates, lanthanide dithiocarbamates, lanthanide xanthates, lanthanide β-diketonates, lanthanide alkoxides or aryloxides, lanthanide pseudo-halides, and organolanthanide compounds.

Without wishing to limit the practice of the present invention, further discussion will focus on neodymium compounds, although those skilled in the art will be able to select similar compounds that are based upon other lanthanide metals.

Neodymium carboxylates include neodymium formate, neodymium acetate, neodymium acrylate, neodymium methacrylate, neodymium valerate, neodymium gluconate, neodymium citrate, neodymium fumarate, neodymium lactate, neodymium maleate, neodymium oxalate, neodymium 2-ethylhexanoate, neodymium neodecanoate (a.k.a. neodymium versatate), neodymium naphthenate, neodymium stearate, neodymium oleate, neodymium benzoate, and neodymium picolinate.

Neodymium organophosphates include neodymium dibutyl phosphate, neodymium dipentyl phosphate, neodymium dihexyl phosphate, neodymium diheptyl phosphate, neodymium dioctyl phosphate, neodymium bis(1-methylheptyl) phosphate, neodymium bis(2-ethylhexyl) phosphate, neodymium didecyl phosphate, neodymium didodecyl phosphate, neodymium dioctadecyl phosphate, neodymium dioleyl phosphate, neodymium diphenyl phosphate, neodymium bis (p-nonylphenyl) phosphate, neodymium butyl (2-ethylhexyl) phosphate, neodymium (1-methylheptyl) (2-ethylhexyl) phosphate, and neodymium (2-ethylhexyl) (p-nonylphenyl) phosphate.

Neodymium organophosphonates include neodymium butyl phosphonate, neodymium pentyl phosphonate, neodymium hexyl phosphonate, neodymium heptyl phosphonate, neodymium octyl phosphonate, neodymium (1-methylheptyl) phosphonate, neodymium (2-ethylhexyl) phosphonate, neodymium decyl phosphonate, neodymium dodecyl phosphonate, neodymium octadecyl phosphonate, neodymium oleyl phosphonate, neodymium phenyl phosphonate, neodymium (p-nonylphenyl) phosphonate, neodymium butyl butylphosphonate, neodymium pentyl pentylphosphonate, neodymium hexyl hexylphosphonate, neodymium heptyl heptylphosphonate, neodymium octyl octylphosphonate, neodymium (1-methylheptyl) (1-methylheptyl)phosphonate, neodymium (2-ethylhexyl) (2-ethylhexyl)phosphonate, neodymium decyl decylphosphonate, neodymium dodecyl dodecylphosphonate, neodymium octadecyl octadecylphosphonate, neodymium oleyl oleylphosphonate, neodymium phenyl phenylphosphonate, neodymium (p-nonylphenyl) (p-nonylphenyl)phosphonate, neodymium butyl (2-ethylhexyl)phosphonate, neodymium (2-ethylhexyl) butylphosphonate, neodymium (1-methylheptyl) (2-ethylhexyl)phosphonate, neodymium (2-ethylhexyl) (1-methylheptyl) phosphonate, neodymium (2-ethylhexyl) (p-nonylphenyl) phosphonate, and neodymium (p-nonylphenyl) (2-ethylhexyl)phosphonate.

Neodymium organophosphinates include neodymium butylphosphinate, neodymium pentylphosphinate, neodymium hexylphosphinate, neodymium heptylphosphinate, neodymium octylphosphinate, neodymium (1-methylheptyl) phosphinate, neodymium (2-ethylhexyl)phosphinate, neodymium decylphosphinate, neodymium dodecylphosphinate, neodymium octadecylphosphinate, neodymium oleylphosphinate, neodymium phenylphosphinate, neodymium (p-nonylphenyl)phosphinate, neodymium dibutylphosphinate, neodymium dipentylphosphinate, neodymium dihexylphosphinate, neodymium diheptylphosphinate, neodymium dioctylphosphinate, neodymium bis(1-methylheptyl)phosphinate, neodymium bis(2-ethylhexyl)phosphinate, neodymium didecylphosphinate, neodymium didodecylphosphinate, neodymium dioctadecylphosphinate, neodymium dioleylphosphinate, neodymium diphenylphosphinate, neodymium bis(p-nonylphenyl)phosphinate, neodymium butyl(2-ethylhexyl)phosphinate, neodymium (1-methylheptyl) (2-ethylhexyl)phosphinate, and neodymium (2-ethylhexyl)(p-nonylphenyl)phosphinate.

Neodymium carbamates include neodymium dimethylcarbamate, neodymium diethylcarbamate, neodymium diisopropylcarbamate, neodymium dibutylcarbamate, and neodymium dibenzylcarbamate.

Neodymium dithiocarbamates include neodymium dimethyldithiocarbamate, neodymium diethyldithiocarbamate, neodymium diisopropyldithiocarbamate, neodymium dibutyldithiocarbamate, and neodymium dibenzyldithiocarbamate.

Neodymium xanthates include neodymium methylxanthate, neodymium ethylxanthate, neodymium isopropylxanthate, neodymium butylxanthate, and neodymium benzylxanthate.

Neodymium β-diketonates include neodymium acetylacetonate, neodymium trifluoroacetylacetonate, neodymium hexafluoroacetylacetonate, neodymium benzoylacetonate, and neodymium 2,2,6,6-tetramethyl-3,5-heptanedionate.

Neodymium alkoxides or aryloxides include neodymium methoxide, neodymium ethoxide, neodymium isopropoxide, neodymium 2-ethylhexoxide, neodymium phenoxide, neodymium nonylphenoxide, and neodymium naphthoxide.

Suitable neodymium pseudo-halides include neodymium cyanide, neodymium cyanate, neodymium thiocyanate, neodymium azide, and neodymium ferrocyanide.

The term organolanthanide compound may refer to any lanthanide compound containing at least one lanthanide-carbon bond. These compounds are predominantly, though not exclusively, those containing cyclopentadienyl (Cp), substituted cyclopentadienyl, allyl, and substituted allyl ligands. Suitable organolanthanide compounds include $Cp_3Ln$, $Cp_2LnR$, $Cp_2LnCl$, $CpLnCl_2$, $CpLn(cyclooctatetraene)$, $(C_5Me_5)_2LnR$, $LnR_3$, $Ln(allyl)_3$, and $Ln(allyl)_2Cl$, where Ln represents a lanthanide atom, and R represents a hydrocarbyl group.

Aluminoxanes include oligomeric linear aluminoxanes that can be represented by the general formula:

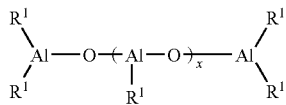

and oligomeric cyclic aluminoxanes that can be represented by the general formula:

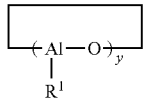

where x may be an integer of 1 to about 100, and in other embodiments about 10 to about 50; y may be an integer of 2 to about 100, and in other embodiments about 3 to about 20; and where each $R^1$, which may be the same or different, may be a mono-valent organic group that is attached to the aluminum atom via a carbon atom. In one or more embodiments, each $R^1$ is a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups. These hydrocarbyl groups may contain heteroatoms such as, but not limited to, nitrogen, oxygen, boron, silicon, sulfur, and phosphorus atoms. In one or more embodiments, the aluminoxanes may be soluble in a hydrocarbon solvent. It should be noted that the number of moles of the aluminoxane as used in this application refers to the number of moles of the aluminum atoms rather than the number of moles of the oligomeric aluminoxane molecules. This convention is commonly employed in the art of catalysis utilizing aluminoxanes.

Aluminoxanes can be prepared by reacting trihydrocarbylaluminum compounds with water. This reaction can be performed according to known methods, such as (1) a method in which the trihydrocarbylaluminum compound may be dissolved in an organic solvent and then contacted with water, (2) a method in which the trihydrocarbylaluminum compound may be reacted with water of crystallization contained in, for example, metal salts, or water adsorbed in inorganic or organic compounds, and (3) a method in which the trihydrocarbylaluminum compound may be reacted with water in the presence of the monomer or monomer solution that is to be polymerized.

Aluminoxane compounds include methylaluminoxane (MAO), modified methylaluminoxane (MMAO), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, 1-methylcyclopentylaluminoxane, phenylaluminoxane, 2,6-dimethylphenylaluminoxane, and the like, and mixtures thereof. Modified methylaluminoxane can be formed by substituting about 20-80% of the methyl groups of methylaluminoxane with $C_2$ to $C_{12}$ hydrocarbyl groups, preferably with isobutyl groups, by using techniques known to those skilled in the art.

Various organoaluminum compounds or mixtures thereof can be used as the organoaluminum compound other than an aluminoxane. The term "organoaluminum compounds" refers to any aluminum compound containing at least one aluminum-carbon bond. In one or more embodiments, organoaluminum compounds other than aluminoxanes include those represented by the formula $AlR_nX_{3-n}$, where each R, which may be the same or different, is a mono-valent organic group that is attached to the aluminum atom via a carbon atom, where each X, which may be the same or different, is a hydrogen atom, a carboxylate group, an alkoxide group, or an aryloxide group, and where n is an integer of 1 to 3. In one or more embodiments, each R may be a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups. These hydrocarbyl groups may contain heteroatoms such as, but not limited to, nitrogen, oxygen, boron, silicon, sulfur, and phosphorus atoms.

Organoaluminum compounds other than an aluminoxane include, but are not limited to, trihydrocarbylaluminum, dihydrocarbylaluminum hydride, hydrocarbylaluminum dihydride, dihydrocarbylaluminum carboxylate, hydrocarbylaluminum bis(carboxylate), dihydrocarbylaluminum alkoxide, hydrocarbylaluminum dialkoxide, dihydrocarbylaluminum aryloxide, and hydrocarbylaluminum diaryloxide compounds.

Trihydrocarbylaluminum compounds include trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris(1-methylcyclopentyl)aluminum, triphenylaluminum, tri-p-tolylaluminum, tris(2,6-dimethylphenyl)aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum.

Dihydrocarbylaluminum hydride compounds include diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride.

Hydrocarbylaluminum dihydrides include ethylaluminum dihydride, n-propylaluminum dihydride, isopropylaluminum dihydride, n-butylaluminum dihydride, isobutylaluminum dihydride, and n-octylaluminum dihydride.

Other organoaluminum compounds other than an aluminoxane include, but are not limited to, dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methylaluminum bis(neodecanoate), ethylaluminum bis(stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, isobutylaluminum diphenoxide, and the like, and mixtures thereof.

Useful bromine-containing compounds include elemental bromine, bromine-containing mixed halogens, and organic bromides. In one or more embodiments, the bromine-containing compounds may be soluble in a hydrocarbon solvent. In other embodiments, hydrocarbon-insoluble bromine-containing compounds, which can be suspended in the polymerization medium to form the catalytically active species, may be useful.

Bromine-containing mixed halogens include at least one bromine atom bonded to at least one other halogen atom besides bromine. Suitable bromine-containing mixed halogens include bromine monofluoride, bromine trifluoride, bromine pentafluoride, bromine monochloride, and iodine monobromide.

Organic bromides include those compounds that include at least one bromine-carbon bond. In one or more embodiments, the organic bromides may be defined by the formula $R_{4-x}CBr_x$, where x is an integer from 1 to 4, and each R is independently a monovalent organic group, a hydrogen atom, or a halogen atom. In particular embodiments, each R is independently a hydrogen atom or a hydrocarbyl group. Hydrocarbyl groups include, but are not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups. These hydrocarbyl groups may contain heteroatoms such as, but not limited to, nitrogen, oxygen, boron, silicon, sulfur, and phosphorus atoms.

Types of organic bromides include, but are not limited to, brominated hydrocarbons, acyl bromides, and brominated carboxylic esters.

Examples of brominated hydrocarbons include, but are not limited to, carbon tetrabromide, tribromomethane (also called bromoform), bromomethane, dibromomethane, t-butyl bromide, 1-bromopropane, 2-bromopropane, 1,3-dibromopropane, 2,2-dimethyl-1-bromopropane (also called neopentyl bromide), allyl bromide, benzyl bromide, diphenylmethyl bromide, triphenylmethyl bromide, bromobenzene, and benzylidene bromide (also called α,α-dibromotoluene or benzal bromide).

Examples of acyl bromides include, but are not limited to, formyl bromide, acetyl bromide, propionyl bromide, butyryl bromide, isobutyryl bromide, valeroyl bromide, isovaleryl bromide, hexanoyl bromide, and benzoyl bromide.

Examples of brominated carboxylic esters include, but are not limited to, methyl bromoformate, methyl bromoacetate, methyl 2-bromopropionate, methyl 3-bromopropionate, methyl 2-bromobutyrate, methyl 2-bromohexanoate, methyl 4-bromocrotonate, methyl 2-bromobenzoate, methyl 3-bromobenzoate, and methyl 4-bromobenzoate.

Iodine-containing compounds may include elemental iodine, iodine-containing mixed halogens, hydrogen iodide, organic iodides, inorganic iodides, metallic iodides, and organometallic iodides.

Suitable iodine-containing mixed halogens include iodine monochloride, iodine monobromide, iodine trichloride, iodine pentafluoride, iodine monofluoride, and iodine triflouride.

Suitable organic iodides include iodomethane, diiodomethane, triiodomethane (also called iodoform), tetraiodomethane, 1-iodopropane, 2-iodopropane, 1,3-diiodopropane, t-butyl iodide, 2,2-dimethyl-1-iodopropane (also called neopentyl iodide), allyl iodide, iodobenzene, benzyl iodide, diphenylmethyl iodide, triphenylmethyl iodide, benzylidene iodide (also called benzal iodide or α,α-diiodotoluene), trimethylsilyl iodide, triethylsilyl iodide, triphenylsilyl iodide, dimethyldiiodosilane, diethyldiiodosilane, diphenyldiiodosilane, methyltriiodosilane, ethyltriiodosilane, phenyltriiodosilane, benzoyl iodide, propionyl iodide, and methyl iodoformate.

Suitable inorganic iodides include silicon tetraiodide, arsenic triiodide, tellurium tetraiodide, boron triiodide, phosphorus triiodide, phosphorus oxyiodide, and selenium tetraiodide.

Suitable metallic iodides include aluminum triiodide, gallium triiodide, indium triiodide, titanium tetraiodide, zinc diiodide, germanium tetraiodide, tin tetraiodide, tin diiodide, antimony triiodide, and magnesium diiodide.

Suitable organometallic iodides include methylmagnesium iodide, dimethylaluminum iodide, diethylaluminum iodide, di-n-butylaluminum iodide, diisobutylaluminum iodide, di-n-octylaluminum iodide, methylaluminum diiodide, ethylaluminum diiodide, n-butylaluminum diiodide, isobutylaluminum diiodide, methylaluminum sesquiiodide, ethylaluminum sesquiiodide, isobutylaluminum sesquiiodide, ethylmagnesium iodide, n-butylmagnesium iodide, isobutylmagnesium iodide, phenylmagnesium iodide, benzylmagnesium iodide, trimethyltin iodide, triethyltin iodide, tri-n-butyltin iodide, di-n-butyltin diiodide, and di-t-butyltin diiodide.

In one or more embodiments, dihydrocarbyl ethers include those compounds represented by the formula R—O—R, where each R, which may be the same or different, is a hydrocarbyl group or substituted hydrocarbyl group. The hydrocarbyl group may contain heteroatoms such as, but not limited to, nitrogen, oxygen, silicon, tin, sulfur, boron, and phosphorous atoms. Examples of hydrocarbyl groups or substituted hydrocarbyl groups include, but are not limited to, alkyl, cycloalkyl, substituted cycloalkyl, alkenyl, cycloalkenyl, aryl, substituted aryl groups and heterocyclic groups.

Exemplary alkyl groups include methyl, ethyl, n-propyl, isopropyl, n-butyl, isobutyl, t-butyl, n-pentyl, isopentyl, neopentyl, n-hexyl, n-heptyl, 2-ethylhexyl, n-octyl, n-nonyl, and n-decyl groups.

Exemplary cycloalkyl groups include cyclopropyl, cyclobutyl, cyclopentyl, cyclohexyl, 2-methylcyclohexyl, 2-t-butylcyclohexyl and 4-t-butylcyclohexyl groups.

Exemplary aryl groups include phenyl, substituted phenyl, biphenyl, substituted biphenyl, bicyclic aryl, substituted bicyclic aryl, polycyclic aryl, and substituted polycyclic aryl groups. Substituted aryl groups include those where a hydrogen atom is replaced by a mono-valent organic group such as a hydrocarbyl group.

Exemplary substituted phenyl groups include 2-methylphenyl, 3-methylphenyl, 4-methylphenyl, 2,3-dimethylphenyl, 3,4-dimethylphenyl, 2,5-dimethylphenyl, 2,6-dimethylphenyl, and 2,4,6-trimethylphenyl (also called mesityl) groups.

Exemplary bicyclic or polycyclic aryl groups include 1-naphthyl, 2-napthyl, 9-anthryl, 9-phenanthryl, 2-benzo[b]thienyl, 3-benzo[b]thienyl, 2-naphtho[2,3-b]thienyl, 2-thianthrenyl, 1-isobenzofuranyl, 2-xanthenyl, 2-phenoxathiinyl, 2-indolizinyl, N-methyl-2-indolyl, N-methyl-indazol-3-yl, N-methyl-8-purinyl, 3-isoquinolyl, 2-quinolyl, 3-cinnolinyl, 2-pteridinyl, N-methyl-2-carbazolyl, N-methyl-β-carbolin-3-yl, 3-phenanthridinyl, 2-acridinyl, 1-phthalazinyl, 1,8-naphthyridin-2-yl, 2-quinoxalinyl, 2-quinazolinyl, 1,7-phenanthrolin-3-yl, 1-phenazinyl, N-methyl-2-phenothiazinyl, 2-phenarsazinyl, and N-methyl-2-phenoxazinyl groups.

Exemplary heterocyclic groups include 2-thienyl, 3-thienyl, 2-furyl, 3-furyl, N-methyl-2-pyrrolyl, N-methyl-3-pyrrolyl, N-methyl-2-imidazolyl, 1-pyrazolyl, N-methyl-3-pyrazolyl, N-methyl-4-pyrazolyl, 2-pyridyl, 3-pyridyl, 4-pyridyl, pyrazinyl, 2-pyrimidinyl, 3-pyridazinyl, 3-isothiazolyl, 3-isoxazolyl, 3-furazanyl, 2-triazinyl, morpholinyl, thiomorpholinyl, piperidinyl, piperazinyl, pyrrolidinyl, pyrrolinyl, imidazolidinyl, and imidazolinyl groups.

Suitable types of dihydrocarbyl ethers include, but are not limited to, dialkyl ethers, dicycloalkyl ethers, diaryl ethers, and mixed dihydrocarbyl ethers.

Specific examples of dialkyl ethers include dimethyl ether, diethyl ether, di-n-propyl ether, diisopropyl ether, di-n-butyl ether, diisobutyl ether, di-t-butyl ether, di-n-pentyl ether, diisopentyl ether, dineopentyl ether, di-n-hexyl ether, di-n-heptyl ether, di-2-ethylhexyl ether, di-n-octyl ether, di-n-nonyl ether, di-n-decyl ether, and dibenzyl ether.

Specific examples of dicycloalkyl ethers include dicyclopropyl ether, dicyclobutyl ether, dicyclopentyl ether, dicyclohexyl ether, di-2-methylcyclohexyl ether, and di-2-t-butylcyclohexyl ether.

Specific examples of diaryl ethers include diphenyl ether, di-o-tolyl ether, di-m-tolyl ether, and di-p-tolyl ether.

Specific examples of mixed dihydrocarbyl ethers include n-butyl methyl ether, isobutyl methyl ether, sec-butyl methyl ether, t-butyl methyl ether, n-butyl ethyl ether, isobutyl ethyl ether, sec-butyl ethyl ether, t-butyl ethyl ether, t-amyl methyl ether, t-amyl ethyl ether, phenyl ethyl ether, phenyl n-propyl ether, phenyl isopropyl ether, phenyl n-butyl ether, phenyl isobutyl ether, phenyl n-octyl ether, p-tolyl ethyl ether, p-tolyl n-propyl ether, p-tolyl isopropyl ether, p-tolyl n-butyl ether, p-tolyl isobutyl ether, p-tolyl t-butyl ether, p-tolyl n-octyl ether, benzyl n-ethyl ether, benzyl n-propyl ether, benzyl isopropyl ether, benzyl n-butyl ether, benzyl isobutyl ether, benzyl t-butyl ether, and benzyl n-octyl ether.

In one or more embodiments, one or both of the hydrocarbyl groups (R) in the dihydrocarbyl ether may contain one or more additional ether linkages (i.e., C—O—C). These ether compounds may be referred to as polyethers. Specific examples of polyethers include glyme ethers such as ethylene glycol dimethyl ether (also called monoglyme), ethylene glycol diethyl ether, diethylene glycol dimethyl ether (also called diglyme), diethylene glycol diethyl ether, diethylene glycol di-n-butyl ether, triethylene glycol dimethyl ether (also called triglyme), triethylene glycol diethyl ether, tetraethylene glycol dimethyl ether (also called tetraglyme), and tetraethylene glycol diethyl ether.

The catalyst composition of this invention may be formed by combining or mixing the foregoing catalyst ingredients. Although one or more active catalyst species are believed to result from the combination of the catalyst ingredients, the degree of interaction or reaction between the various catalyst ingredients or components is not known with any great degree of certainty. The combination or reaction product of the lanthanide compound, the aluminoxane, the organoaluminum compound other than an aluminoxane, and the bromine-containing compound is conventionally referred to as a catalyst system or catalyst composition. The dihydrocarbyl ether, as used herein, may be referred to as a component of that system or as a modifier to that system. In this respect, reference to catalyst ingredients refers to the lanthanide compound, the aluminoxane, the organoaluminum compound other than an aluminoxane, the bromine-containing compound, and the dihydrocarbyl ether. The term modified catalyst composition or modified catalyst system may be employed to encompass a simple mixture of the ingredients, a complex of the various ingredients that is caused by physical or chemical forces of attraction, a chemical reaction product of the ingredients, or a combination of the foregoing.

The catalyst composition of this invention advantageously has a technologically useful catalytic activity for polymerizing conjugated dienes into polydienes over a wide range of catalyst concentrations and catalyst ingredient ratios. Several factors may impact the optimum concentration of any one of the catalyst ingredients. For example, because the catalyst ingredients may interact to form an active species, the optimum concentration for any one catalyst ingredient may be dependent upon the concentrations of the other catalyst ingredients.

In one or more embodiments, the molar ratio of the aluminoxane to the lanthanide compound (aluminoxane/Ln) can be varied from 5:1 to about 1,000:1, in other embodiments from about 10:1 to about 700:1, and in other embodiments from about 20:1 to about 500:1.

In one or more embodiments, the molar ratio of the organoaluminum compound other than an aluminoxane to the lanthanide compound (Al/Ln) can be varied from about 1:1 to about 200:1, in other embodiments from about 2:1 to about 150:1, and in other embodiments from about 5:1 to about 100:1.

The molar ratio of the bromine-containing compound to the lanthanide compound is best described in terms of the ratio of the moles of bromine atoms in the bromine-containing compound to the moles of lanthanide atoms in the lanthanide compound (Br/Ln). In one or more embodiments, the bromine/Ln molar ratio can be varied from about 0.5:1 to about 20:1, in other embodiments from about 1:1 to about 10:1, and in other embodiments from about 2:1 to about 6:1.

In these or other embodiments, the molar ratio of the iodine atoms in the iodine-containing compounds to the bromine atoms in the bromine-containing compounds (I/Br) may be varied from about 0.1:1 to about 10:1, in other embodiments from about 0.5:1 to about 5:1, and in other embodiments from about 0.8:1 to about 2:1.

In one or more embodiments, the molar ratio of the dihydrocarbyl ether to the lanthanide compound (ether/Ln) can be varied from 0.5:1 to about 1,000:1, in other embodiments from about 1:1 to about 700:1, and in other embodiments from about 5:1 to about 500:1.

The lanthanide-based catalyst can be formed by employing several techniques. For example, the catalyst may be formed by adding the catalyst components directly to the monomer to be polymerized. In this respect, the catalyst components including the dihydrocarbyl ether may be added either in a stepwise or simultaneous manner. In one embodiment, when the catalyst ingredients are added in a stepwise manner, the dihydrocarbyl ether can be added first, followed by the aluminoxane, followed by the lanthanide compound, followed by the organoaluminum compound other than aluminoxane, and ultimately followed by the bromine-containing compound optionally with the iodine-containing compound. Where both a bromine-containing compound and an iodine-containing compound are employed, they may be pre-mixed with one another or added individually. The addition of the catalyst components directly and individually to the monomer to be polymerized may be referred to as an in situ formation of the catalyst system.

In other embodiments, the catalyst may be preformed. That is, the catalyst ingredients including the dihydrocarbyl ether may be introduced and pre-mixed outside of the monomer to be polymerized. In particular embodiments, the preformation of the catalyst may occur either in the absence of any monomer or in the presence of a small amount of at least one conjugated diene monomer at an appropriate temperature, which is generally from about −20° C. to about 80° C. Mixtures of conjugated diene monomers may also be used. The amount of conjugated diene monomer that may be used for preforming the catalyst can range from about 1 to about 500 moles, in other embodiments from about 5 to about 250 moles, and in other embodiments from about 10 to about 100 moles per mole of the lanthanide compound. The resulting preformed catalyst composition can be aged, if desired, prior to being added to the monomer that is to be polymerized.

In other embodiments, the catalyst may be formed by using a two-stage procedure. The first stage can involve combining the lanthanide compound with the aluminoxane and the organoaluminum compound other than an aluminoxane either in the absence of any monomer or in the presence of a small amount of at least one conjugated diene monomer at an appropriate temperature (e.g., −20° C. to about 80° C.). The amount of monomer employed in preparing this first-stage mixture may be similar to that set forth above for preforming the catalyst. In the second stage, the mixture prepared in the first stage, the dihydrocarbyl ether, and the bromine-containing compound optionally together with the iodine-containing compound can be added in either a stepwise or simultaneous manner to the monomer that is to be polymerized. In one embodiment, the dihydrocarbyl ether can be added first, followed by the mixture prepared in the first stage, and then followed by the bromine-containing compound optionally together with the iodine-containing compound.

In one or more embodiments, a solvent may be employed as a carrier to either dissolve or suspend the catalyst or catalyst ingredients in order to facilitate the delivery of the catalyst or catalyst ingredients to the polymerization system. In other embodiments, conjugated diene monomer can be used as the catalyst carrier. In yet other embodiments, the catalyst ingredients can be used in their neat state without any solvent.

In one or more embodiments, suitable solvents include those organic compounds that will not undergo polymerization or incorporation into propagating polymer chains during the polymerization of monomer in the presence of catalyst. In one or more embodiments, these organic species are liquid at ambient temperature and pressure. In one or more embodiments, these organic solvents are inert to the catalyst. Exemplary organic solvents include hydrocarbons with a low or relatively low boiling point such as aromatic hydrocarbons, aliphatic hydrocarbons, and cycloaliphatic hydrocarbons. Non-limiting examples of aromatic hydrocarbons include benzene, toluene, xylenes, ethylbenzene, diethylbenzene, and mesitylene. Non-limiting examples of aliphatic hydrocarbons include n-pentane, n-hexane, n-heptane, n-octane, n-nonane, n-decane, isopentane, isohexanes, isopentanes, isooctanes, 2,2-dimethylbutane, petroleum ether, kerosene, and petroleum spirits. And, non-limiting examples of cycloaliphatic hydrocarbons include cyclopentane, cyclohexane, methylcyclopentane, and methylcyclohexane. Mixtures of the above hydrocarbons may also be used. As is known in the art, aliphatic and cycloaliphatic hydrocarbons may be desirably employed for environmental reasons. The low-boiling hydrocarbon solvents are typically separated from the polymer upon completion of the polymerization.

Other examples of organic solvents include high-boiling hydrocarbons of high molecular weights, such as paraffinic oil, aromatic oil, or other hydrocarbon oils that are commonly used to oil-extend polymers. Since these hydrocarbons are non-volatile, they typically do not require separation and remain incorporated in the polymer.

The production of polydienes according to this invention can be accomplished by polymerizing conjugated diene monomer in the presence of a catalytically effective amount of the foregoing catalyst composition. The introduction of the catalyst composition, the conjugated diene monomer, and any solvent if employed forms a polymerization mixture in which the polymer product is formed. The total catalyst concentration to be employed in the polymerization mixture may depend on the interplay of various factors such as the purity of the ingredients, the polymerization temperature, the polymerization rate and conversion desired, the molecular weight desired, and many other factors. Accordingly, a specific total catalyst concentration cannot be definitively set forth except to say that catalytically effective amounts of the respective catalyst ingredients can be used. In one or more embodiments, the amount of the lanthanide compound used can be varied from about 0.01 to about 2 mmol, in other embodiments from about 0.02 to about 1 mmol, and in other embodiments from about 0.05 to about 0.5 mmol per 100 g of conjugated diene monomer.

In one or more embodiments, the polymerization system employed may be generally considered a bulk polymerization system that includes substantially no solvent or a minimal amount of solvent. Those skilled in the art will appreciate the benefits of bulk polymerization processes (i.e., processes where monomer acts as the solvent), and therefore the polymerization system includes less solvent than will deleteriously impact the benefits sought by conducting bulk polymerization. In one or more embodiments, the solvent content of the polymerization mixture may be less than about 20% by weight, in other embodiments less than about 10% by weight, and in still other embodiments less than about 5% by weight based on the total weight of the polymerization mixture. In still another embodiment, the polymerization mixture is substantially devoid of solvent, which refers to the absence of that amount of solvent that would otherwise have an appreciable impact on the polymerization process. Polymerization systems that are substantially devoid of solvent may be referred to as including substantially no solvent. In particular embodiments, the polymerization mixture is devoid of solvent.

The polymerization may be conducted in any conventional polymerization vessels known in the art. In one or more embodiments, solution polymerization can be conducted in a conventional stirred-tank reactor. In other embodiments, bulk polymerization can be conducted in a conventional stirred-tank reactor, especially if the monomer conversion is less than about 60%. In still other embodiments, especially where the monomer conversion in a bulk polymerization process is higher than about 60%, which typically results in a highly viscous cement, the bulk polymerization may be conducted in an elongated reactor in which the viscous cement under polymerization is driven to move by piston, or substantially by piston. For example, extruders in which the cement is pushed along by a self-cleaning single-screw or double-screw agitator are suitable for this purpose. Examples of useful bulk polymerization processes are disclosed in U.S. Publication No. 2005/0197474 A1, which is incorporated herein by reference.

In one or more embodiments, all of the ingredients used for the polymerization can be combined within a single vessel (e.g., a conventional stirred-tank reactor), and all steps of the polymerization process can be conducted within this vessel. In other embodiments, two or more of the ingredients can be pre-combined in one vessel and then transferred to another vessel where the polymerization of monomer (or at least a major portion thereof) may be conducted.

The polymerization can be carried out as a batch process, a continuous process, or a semi-continuous process. In the semi-continuous process, the monomer is intermittently charged as needed to replace that monomer already polymerized. In one or more embodiments, the conditions under which the polymerization proceeds may be controlled to maintain the temperature of the polymerization mixture within a range from about −10° C. to about 200° C., in other embodiments from about 0° C. to about 150° C., and in other embodiments from about 20° C. to about 100° C. In one or more embodiments, the heat of polymerization may be removed by external cooling by a thermally controlled reactor jacket, internal cooling by evaporation and condensation of the monomer through the use of a reflux condenser connected to the reactor, or a combination of the two methods. Also, conditions may be controlled to conduct the polymerization under a pressure of from about 0.1 atmosphere to about 50 atmospheres, in other embodiments from about 0.5 atmosphere to about 20 atmospheres, and in other embodiments from about 1 atmosphere to about 10 atmospheres. In one or more embodiments, the pressures at which the polymerization may be carried out include those that ensure that the majority of the monomer is in the liquid phase. In these or other embodiments, the polymerization mixture may be maintained under anaerobic conditions.

The polydienes produced by the polymerization process of this invention may possess pseudo-living characteristics, such that some of polymer chains in these polymers have reactive chain ends. Once a desired monomer conversion is achieved, a functionalizing agent may optionally be introduced into the polymerization mixture to react with any reactive polymer chains so as to give a functionalized polymer. In one or more embodiments, the functionalizing agent is introduced prior to contacting the polymerization mixture with a quenching agent. In other embodiments, the functionalizing agent may be introduced after the polymerization mixture has been partially quenched with a quenching agent.

In one or more embodiments, functionalizing agents include compounds or reagents that can react with a reactive polymer produced by this invention and thereby provide the polymer with a functional group that is distinct from a propagating chain that has not been reacted with the functionalizing agent. The functional group may be reactive or interactive with other polymer chains (propagating and/or non-propagating) or with other constituents such as reinforcing fillers (e.g. carbon black) that may be combined with the polymer. In one or more embodiments, the reaction between the functionalizing agent and the reactive polymer proceeds via an addition or substitution reaction.

Useful functionalizing agents may include compounds that simply provide a functional group at the end of a polymer chain without joining two or more polymer chains together, as well as compounds that can couple or join two or more polymer chains together via a functional linkage to form a single macromolecule. The latter type of functionalizing agents may also be referred to as coupling agents.

In one or more embodiments, functionalizing agents include compounds that will add or impart a heteroatom to the polymer chain. In particular embodiments, functionalizing agents include those compounds that will impart a functional group to the polymer chain to form a functionalized polymer that reduces the 50° C. hysteresis loss of a carbon-black filled vulcanizates prepared from the functionalized polymer as compared to similar carbon-black filled vulcanizates prepared from non-functionalized polymer. In one or more embodiments, this reduction in hysteresis loss is at least 5%, in other embodiments at least 10%, and in other embodiments at least 15%.

In one or more embodiments, suitable functionalizing agents include those compounds that contain groups that may react with pseudo-living polymers (e.g., those produced in accordance with this invention). Exemplary functionalizing agents include ketones, quinones, aldehydes, amides, esters, isocyanates, isothiocyanates, epoxides, imines, aminoketones, aminothioketones, and acid anhydrides. Examples of these compounds are disclosed in U.S. Pat. Nos. 4,906,706, 4,990,573, 5,064,910, 5,567,784, 5,844,050, 6838,526, 6977,281, and 6,992,147; U.S. Pat. Publication Nos. 2006/0004131 A1, 2006/0025539 A1, 2006/0030677 A1, and 2004/0147694 A1; Japanese Patent Application Nos. 05-051406A, 05-059103A, 10-306113A, and 11-035633A; which are incorporated herein by reference. Other examples of functionalizing agents include azine compounds as described in U.S. Ser. No. 11/640,711, hydrobenzamide compounds as disclosed in U.S. Ser. No. 11/710,713, nitro compounds as disclosed in U.S. Ser. No. 11/710,845, and protected oxime compounds as disclosed in U.S. Publication No. 2008-0146745 A1, all of which are incorporated herein by reference.

In particular embodiments, the functionalizing agents employed may be coupling agents which include, but are not limited to, metal halides such as tin tetrachloride, metalloid halides such as silicon tetrachloride, metal ester-carboxylate complexes such as dioctyltin bis(octylmaleate), alkoxysilanes such as tetraethyl orthosilicate, and alkoxystannanes such as tetraethoxytin. Coupling agents can be employed either alone or in combination with other functionalizing agents. The combination of functionalizing agents may be used in any molar ratio.

The amount of functionalizing agent introduced to the polymerization mixture may depend upon various factors including the type and amount of catalyst used to initiate the polymerization, the type of functionalizing agent, the desired level of functionality and many other factors. In one or more embodiments, the amount of functionalizing agent may be in a range of from about 1 to about 200 moles, in other embodiments from about 5 to about 150 moles, and in other embodiments from about 10 to about 100 moles per mole of the lanthanide compound.

Because reactive polymer chains may slowly self-terminate at high temperatures, in one embodiment the functionalizing agent may be added to the polymerization mixture once a peak polymerization temperature is observed. In other embodiments, the functionalizing agent may be added within about 25 to 35 minutes after the peak polymerization temperature is reached.

In one or more embodiments, the functionalizing agent may be introduced to the polymerization mixture after a desired monomer conversion is achieved but before a quenching agent containing a protic hydrogen atom is added. In one or more embodiments, the functionalizing agent is added to the polymerization mixture after a monomer conversion of at least 5%, in other embodiments at least 10%, in other embodiments at least 20%, in other embodiments at least 50%, and in other embodiments at least 80%. In these or other embodiments, the functionalizing agent is added to the polymerization mixture prior to a monomer conversion of 90%, in other embodiments prior to 70% monomer conversion, in other embodiments prior to 50% monomer conversion, in other embodiments prior to 20% monomer conversion, and in other embodiments prior to 15% monomer conversion. In one or more embodiments, the functionalizing agent is added after complete, or substantially complete monomer conversion. In particular embodiments, a functionalizing agent may be introduced to the polymerization mixture immediately prior to, together with, or after the introduction of a Lewis base as disclosed in co-pending U.S. Publication No. 2009-0043046 A1, filed on Aug. 7, 2007, which is incorporated herein by reference.

In one or more embodiments, the functionalizing agent may be introduced to the polymerization mixture at a location (e.g., within a vessel) where the polymerization (or at least a portion thereof) has been conducted. In other embodiments, the functionalizing agent may be introduced to the polymerization mixture at a location that is distinct from where the polymerization (or at least a portion thereof) has taken place. For example, the functionalizing agent may be introduced to the polymerization mixture in downstream vessels including downstream reactors or tanks, in-line reactors or mixers, extruders, or devolatilizers.

Once a functionalizing agent has optionally been introduced to the polymerization mixture and/or a desired reaction time has been provided, a quenching agent can be added to the polymerization mixture in order to inactivate any residual reactive polymer chains and the catalyst or catalyst components. The quenching agent may be a protic compound, which includes, but is not limited to, an alcohol, a carboxylic acid, an inorganic acid, water, or a mixture thereof. In particular embodiments, the quenching agent includes a polyhydroxy compound as disclosed in copending U.S. Ser. No. 11/890,591, filed on Aug. 7, 2007, which is incorporated herein by reference. An antioxidant such as 2,6-di-t-butyl-4-methylphenol may be added along with, before, or after the addition of the quenching agent. The amount of the antioxidant employed may be in the range of about 0.2% to about 1% by weight of the polymer product. The quenching agent and the antioxidant may be added as neat materials or, if necessary, dissolved in a hydrocarbon solvent or conjugated diene monomer prior to being added to the polymerization mixture.

In one or more embodiments, the quenching agent is added to the polymerization mixture after a monomer conversion of at least 5%, in other embodiments at least 10%, in other embodiments at least 20%, in other embodiments at least 50%, and in other embodiments at least 80%. In these or other embodiments, the quenching agent is added to the polymerization mixture prior to a monomer conversion of 90%, in other embodiments prior to 70% monomer conversion, in other embodiments prior to 50% monomer conversion, in other embodiments prior to 20% monomer conversion, and in other embodiments prior to 15% monomer conversion.

Once the polymerization mixture has been quenched, the various constituents of the polymerization mixture may be recovered. In one or more embodiments, the unreacted monomer can be recovered from the polymerization mixture. For example, the monomer can be distilled from the polymerization mixture by using techniques known in the art. In one or more embodiments, a devolatilizer may be employed to remove the monomer from the polymerization mixture. Once the monomer has been removed from the polymerization mixture, the monomer may be purified, stored, and/or recycled back to the polymerization process.

The polymer product may be recovered from the polymerization mixture by using techniques known in the art. In one or more embodiments, desolventization and drying techniques may be used. For instance, the polymer can be recovered by passing the polymerization mixture through a heated screw apparatus, such as a desolventizing extruder, in which the volatile substances are removed by evaporation at appropriate temperatures (e.g., about 100° C. to about 170° C.) and under atmospheric or sub-atmospheric pressure. This treatment serves to remove unreacted monomer as well as any low-boiling solvent. Alternatively, the polymer can also be recovered by subjecting the polymerization mixture to steam desolventization, followed by drying the resulting polymer crumbs in a hot air tunnel. The polymer can also be recovered by directly drying the polymerization mixture on a drum dryer.

Where cis-1,4-polydienes (e.g., cis-1,4-polybutadiene) are produced by one or more embodiments of the process of this invention, the cis-1,4-polydienes may advantageously have a cis-1,4 linkage content in excess of 96%, in other embodiments in excess of 97%, in other embodiments in excess of 98%, in other embodiments in excess of 99.0%, in other embodiments in excess of 99.1%, in other embodiments in excess of 99.2%, and in other embodiments in excess of 99.3%. In these or other embodiments, the polydienes (e.g., cis-1,4-polybutadiene) have a molecular weight distribution of less than 2.5, in other embodiments less than 2.2, in other embodiments less than 2.0, in other embodiments less than 1.8, and in other embodiments less than 1.6.

Advantageously, these polymers exhibit excellent viscoelastic properties and are particularly useful in the manufacture of various tire components including, but not limited to, tire treads, sidewalls, subtreads, and bead fillers. The cis-1,4-polydienes can be used as all or part of the elastomeric component of a tire stock. When the cis-1,4-polydienes are used in conjunction with other rubbers to form the elastomeric component of a tire stock, these other rubbers may be natural rubber, synthetic rubbers, and mixtures thereof. Examples of synthetic rubber include polyisoprene, poly(styrene-co-butadiene), polybutadiene with low cis-1,4-linkage content, poly(styrene-co-butadiene-co-isoprene), and mixtures thereof. The cis-1,4-polydienes can also be used in the manufacture of hoses, belts, shoe soles, window seals, other seals, vibration damping rubber, and other industrial products.

In order to demonstrate the practice of the present invention, the following examples have been prepared and tested.

The examples should not, however, be viewed as limiting the scope of the invention. The claims will serve to define the invention.

EXAMPLES

Example 1

The polymerization reactor consisted of a one-gallon stainless cylinder equipped with a mechanical agitator (shaft and blades) capable of mixing high viscosity polymer cement. The top of the reactor was connected to a reflux condenser system for conveying, condensing, and recycling the 1,3-butadiene vapor developed inside the reactor throughout the duration of the polymerization. The reactor was also equipped with a cooling jacket chilled by cold water. The heat of polymerization was dissipated partly by internal cooling through the use of the reflux condenser system, and partly by external cooling through heat transfer to the cooling jacket.

The reactor was thoroughly purged with a stream of dry nitrogen, which was then replaced with 1,3-butadiene vapor by charging 100 g of dry 1,3-butadiene monomer to the reactor, heating the reactor to 65° C., and then venting the 1,3-butadiene vapor from the top of the reflux condenser system until no liquid 1,3-butadiene remained in the reactor. Cooling water was applied to the reflux condenser and the reactor jacket, and 1302 g of 1,3-butadiene monomer and 7.8 mL of dibutyl ether (n-Bu$_2$O) in hexane was charged into the reactor. After the monomer was thermostated at 32° C., the polymerization was initiated by charging into the reactor a preformed catalyst that had been prepared by mixing 6.5 g of 19.2 wt % 1,3-butadiene in hexane, 1.44 ml of 0.054 M neodymium versatate in hexane, 5.20 ml of 1.5 M methylaluminoxane (MAO) in toluene, 2.81 ml of 1.0 M diisobutylaluminum hydride (DIBAH) in hexane, and 3.12 ml of 0.05 M tetrabromomethane (CBr$_4$) in hexane and allowing the mixture to age for 15 minutes. After 3.5 minutes from its commencement, the polymerization was terminated by diluting the polymerization mixture with 1360 g of hexane and dropping the batch to 3 gallons of isopropanol containing 5 g of 2,6-di-tert-butyl-4-methylphenol. The coagulated polymer was drum-dried. The yield of the polymer was 143.2 g (11.0% conversion). The Mooney viscosity (ML$_{1+4}$) of the polymer was determined to be 21.3 at 100° C. by using a Monsanto Mooney viscometer with a large rotor, a one-minute warm-up time, and a four minute running time. As determined by gel permeation chromatography (GPC), the polymer had a number average molecular weight (Me) of 110,000, a weight average molecular weight (M$_w$) of 262,000, and a molecular weight distribution (M$_w$/M$_n$) of 2.4. The infrared spectroscopic analysis of the polymer indicated a cis 1,4-linkage content of 99.2%, a trans 1,4-linkage content of 0.6%, and a 1,2-linkage content of 0.2%.

Example 2

Comparative Example

The same procedure as used in Example 1 was used except that 2.50 ml of 1.0 M DIBAH in hexane was added, and tetrabromosilane (SiBr$_4$) was used instead of CBr$_4$. After 20.0 minutes from its commencement, the polymerization was terminated by diluting the polymerization mixture with 1360 g of hexane and dropping the batch to 3 gallons of isopropanol containing 5 g of 2,6-di-tert-butyl-4-methylphenol. The coagulated polymer was drum-dried. The yield of the polymer was 36.9 g (2.8% conversion). The resulting polymer had the following properties: ML$_{1+4}$=appeared to be very low and was not measured, M$_n$=59,000, M$_w$=164,000, M$_w$/M$_n$=2.8, cis 1,4-linkage content=92.3%, trans 1,4-linkage content=5.5%, and 1,2-linkage content=2.2%.

Example 3

Comparative Example

The same procedure as used in Example 1 was used except that tin (IV) bromide (SnBr$_4$) was used instead of CBr$_4$. After 4.3 minutes from its commencement, the polymerization formed polymer gel on the agitator of the reactor. Upon gel formation, the polymerization was immediately terminated by diluting the polymerization mixture with 1360 g of hexane and dropping the batch to 3 gallons of isopropanol containing 5 g of 2,6-di-tert-butyl-4-methylphenol. The coagulated polymer was drum-dried. The yield of the polymer was 51.4 g (3.9% conversion). The resulting polymer had the following properties: ML$_{1+4}$=35.7, M$_n$=85,000, M$_w$=530,000, M$_w$/M$_n$=6.2, cis 1,4-linkage content=99.3%, trans 1,4-linkage content=0.5%, and 1,2-linkage content=0.2%.

A comparison of the results (Table 1) obtained in Example 1 with those obtained in Comparative Example 2 indicates that the use of CBr$_4$ instead of SiBr$_4$ yields a polymer with a high cis-1,4-linkage content and a narrow molecular weight distribution at a desired Mooney viscosity. The addition of SiBr$_4$ provided a less active catalyst. Comparing Example 1 to Comparative Example 3, although SnBr$_4$ resulted in the formation of cis-1,4-polybutadiene having a high cis-1,4-linkage content, the catalyst was too active resulting in the formation of polymer gel during the polymerization which led to a broad molecular weight distribution.

TABLE 1

Comparing Polymers Prepared Using Tetrabromo-Compounds.

| Example | 1 | 2 | 3 |
| --- | --- | --- | --- |
| Nd/100 g Bd (mmol) | 0.006 | 0.006 | 0.006 |
| NdV/MAO/DIBAH/halide | 1/100/36/1 | 1/100/32/1 | 1/100/36/1 |
| Bu$_2$O/Nd | 40/1 | 40/1 | 40/1 |
| Halide | CBr$_4$ | SiBr$_4$ | SnBr$_4$ |
| Gel Formation | no | no | yes |
| Percent Conversion | 11.0 | 2.8 | 3.9 |
| ML$_{1+4}$ | 21.3 | very low | 35.7 |
| Mn (kg/mol) | 110 | 59 | 85 |
| Mw (kg/mol) | 262 | 164 | 530 |
| MWD | 2.4 | 2.8 | 6.2 |
| % cis | 99.2 | 92.3 | 99.3 |
| % trans | 0.6 | 5.5 | 0.5 |
| % vinyl | 0.2 | 2.2 | 0.2 |

Example 4

The same procedure as used in Example 1 was used except that 2-bromo-2-methylpropane (t-BuBr) was used instead of CBr$_4$. After 3.0 minutes from its commencement, the polymerization was terminated by diluting the polymerization mixture with 1360 g of hexane and dropping the batch to 3 gallons of isopropanol containing 5 g of 2,6-di-tert-butyl-4-methylphenol. The coagulated polymer was drum-dried. The yield of the polymer was 134.7 g (10.3% conversion). The resulting polymer had the following properties: ML$_{1+4}$=29.9, M$_n$=132,000, M$_w$=269,000, M$_w$/M$_n$=2.0, cis 1,4-linkage content=99.3%, trans 1,4-linkage content=0.6%, and 1,2-linkage content=0.1%.

Example 5

Comparative Example

The same procedure as used in Example 1 was used except that 2.65 ml of 1.0 M DIBAH in hexane was added, and 2-chloro-2-methylpropane (t-BuCl) was used instead of $CBr_4$. After 2.8 minutes from its commencement, the polymerization formed polymer gel on the agitator of the reactor. Upon gel formation, the polymerization was immediately terminated by diluting the polymerization mixture with 1360 g of hexane and dropping the batch to 3 gallons of isopropanol containing 5 g of 2,6-di-tert-butyl-4-methylphenol. The coagulated polymer was drum-dried. The yield of the polymer was 149.0 g (11.4% conversion). The resulting polymer had the following properties: $ML_{1+4}$=11.3, $M_n$=111,000, $M_w$=188,000, $M_w/M_n$=1.7, cis 1,4-linkage content=98.9%, trans 1,4-linkage content=0.9%, and 1,2-linkage content=0.2%.

Example 6

Comparative Example

The same procedure as used in Example 1 was used except that 2.50 ml of 1.0 M DIBAH in hexane was added, and 2-iodo-2-methylpropane (t-BuI) was used instead of $CBr_4$. After 10.0 minutes from its commencement, the polymerization was terminated by diluting the polymerization mixture with 1360 g of hexane and dropping the batch to 3 gallons of isopropanol containing 5 g of 2,6-di-tert-butyl-4-methylphenol. The coagulated polymer was drum-dried. The yield of the polymer was 175.4 g (12.9% conversion). The resulting polymer had the following properties: $ML_{1+4}$=29.2, $M_n$=156,000, $M_w$=237,000, $M_w/M_n$=1.5, cis 1,4-linkage content=98.8%, trans 1,4-linkage content=0.9%, and 1,2-linkage content=0.3%.

A comparison of the results (Table 2) obtained in Example 4 with those obtained in Comparative Example 5 indicates that the use of t-BuBr instead of t-BuCl yields a polymer with a high cis-1,4-linkage content and a narrow molecular weight distribution at a desired Mooney viscosity without the formation of gel during the polymerization. Comparing Example 4 to Comparative Example 6, t-BuBr results in the formation of cis-1,4-polybutadiene having a higher cis-1,4-linkage content than t-BuI.

TABLE 2

Comparing Polymers Prepared Using Monobromo-Compounds.

| Example | 4 | 5 | 6 |
|---|---|---|---|
| Nd/100 g Bd (mmol) | 0.006 | 0.006 | 0.006 |
| NdV/MAO/DIBAH/halide | 1/100/36/2 | 1/100/34/2 | 1/100/32/2 |
| $Bu_2O$/Nd | 40/1 | 40/1 | 40/1 |
| Halide | t-BuBr | t-BuCl | t-BuI |
| Gel Formation | no | yes | no |
| Percent Conversion | 10.3 | 11.4 | 12.9 |
| $ML_{1+4}$ | 29.9 | 11.3 | 29.2 |
| Mn (kg/mol) | 132 | 111 | 156 |
| Mw (kg/mol) | 269 | 188 | 237 |
| MWD | 2.0 | 1.7 | 1.5 |
| % Cis | 99.3 | 98.9 | 98.8 |
| % Trans | 0.6 | 0.9 | 0.9 |
| % Vinyl | 0.1 | 0.2 | 0.3 |

Example 7

The same procedure as used in Example 1 was used except that 2.73 ml of 1.0 M DIBAH in hexane was added. After 2.8 minutes from its commencement, the polymerization was terminated by diluting the polymerization mixture with 1360 g of hexane and dropping the batch to 3 gallons of isopropanol containing 5 g of 2,6-di-tert-butyl-4-methylphenol. The coagulated polymer was drum-dried. The yield of the polymer was 157.2 g (12.1% conversion). The resulting polymer had the following properties: $ML_{1+4}$=14.9, $M_n$=117,000, $M_w$=213,000, $M_w/M_n$=1.8, cis 1,4-linkage content=99.1%, trans 1,4-linkage content=0.7%, and 1,2-linkage content=0.2%.

Example 8

Comparative Example

The same procedure as used in Example 1 was used except that the addition of $n-Bu_2O$ was omitted. After 1.7 minutes from its commencement, the polymerization was immediately terminated by diluting the polymerization mixture with 1360 g of hexane and dropping the batch to 3 gallons of isopropanol containing 5 g of 2,6-di-tert-butyl-4-methylphenol. The coagulated polymer was drum-dried. The yield of the polymer was 164.3 g (12.6% conversion). The resulting polymer had the following properties: $ML_{1+4}$=15.2, $M_n$=127,000, $M_w$=179,000, $M_w/M_n$=1.4, cis 1,4-linkage content=98.3%, trans 1,4-linkage content=1.5%, and 1,2-linkage content=0.2%.

Comparing Example 7 to Comparative Example 8 in Table 3, the addition of $n-Bu_2O$ increases cis 1,4-linkage content.

Example 9

The same procedure as used in Example 1 was used except that 3.12 ml of 0.05 M t-BuBr in hexane was added. After 3.0 minutes from its commencement, the polymerization was terminated by diluting the polymerization mixture with 1360 g of hexane and dropping the batch to 3 gallons of isopropanol containing 5 g of 2,6-di-tert-butyl-4-methylphenol. The coagulated polymer was drum-dried. The yield of the polymer was 134.7 g (10.3% conversion). The resulting polymer had the following properties: $ML_{1+4}$=29.9, $M_n$=132,000, $M_w$=269,000, $M_w/M_n$=2.0, cis 1,4-linkage content=99.3%, trans 1,4-linkage content=0.6%, and 1,2-linkage content=0.1%.

Example 10

Comparative Example

The same procedure as used in Example 1 was used except that the addition of $n-Bu_2O$ was omitted and 3.12 ml of 0.05 M t-BuBr in hexane was added. After 0.7 minutes from its commencement, the polymerization formed polymer gel on the agitator of the reactor. Upon gel formation, the polymerization was immediately terminated by diluting the polymerization mixture with 1360 g of hexane and dropping the batch to 3 gallons of isopropanol containing 5 g of 2,6-di-tert-butyl-4-methylphenol. The coagulated polymer was drum-dried. The yield of the polymer was 59.5 g (4.6% conversion). The resulting polymer had the following properties: $ML_{1+4}$=8.0, $M_n$=84,000, $M_w$=157,000, $M_w/M_n$=1.9, cis 1,4-linkage content=98.5%, trans 1,4-linkage content=1.3%, and 1,2-linkage content=0.2%.

Comparing Example 9 to Comparative Example 10 in Table 3, the addition of n-Bu$_2$O increases cis 1,4-linkage content and prevents formation of gel during the polymerization reaction.

Example 11

The same procedure as used in Example 1 was used except that 1.56 ml of 0.05 M Br$_2$ in hexane was added. After 3.3 minutes from its commencement, the polymerization was terminated by diluting the polymerization mixture with 1360 g of hexane and dropping the batch to 3 gallons of isopropanol containing 5 g of 2,6-di-tert-butyl-4-methylphenol. The coagulated polymer was drum-dried. The yield of the polymer was 160.4 g (12.3% conversion). The resulting polymer had the following properties: ML$_{1+4}$=23.9, M$_n$=132,000, M$_w$=235,000, M$_w$/M$_n$=1.8, cis 1,4-linkage content=99.2%, trans 1,4-linkage content=0.7%, and 1,2-linkage content=0.1%.

Example 12

Comparative Example

The same procedure as used in Example 1 was used except that the addition of n-Bu$_2$O was omitted and 1.56 ml of 0.05 M Br$_2$ in hexane was added. After 0.3 minutes from its commencement, the polymerization formed polymer gel on the agitator of the reactor. Upon gel formation, the polymerization was immediately terminated by diluting the polymerization mixture with 1360 g of hexane and dropping the batch to 3 gallons of isopropanol containing 5 g of 2,6-di-tert-butyl-4-methylphenol. The coagulated polymer was drum-dried. The yield of the polymer was 67.0 g (5.1% conversion). The resulting polymer had the following properties: ML$_{1+4}$=3.7, M$_n$=71,000, M$_w$=127,000, M$_w$/M$_n$=1.8, cis 1,4-linkage content=98.4%, trans 1,4-linkage content=1.3%, and 1,2-linkage content=0.3%.

Comparing Example 11 to Comparative Example 12 in Table 3, the addition of n-Bu$_2$O increases cis 1,4-linkage content and prevents formation of gel during the polymerization reaction.

Example 13

Comparative Example

The same procedure as used in Example 7 was used except that the addition of DIBAH was omitted. After 20.0 minutes from its commencement, the polymerization reaction was terminated by diluting the polymerization mixture with 1360 g of hexane and dropping the batch to 3 gallons of isopropanol containing 5 g of 2,6-di-tert-butyl-4-methylphenol. No polymer product was present in the mixture. Comparing Example 7 to Comparative Example 13 in Table 4, an organoaluminum compound (e.g., DIBAH) other than an aluminoxane is necessary for a polymerization to occur.

Example 14

Comparative Example

The same procedure as used in Example 7 was used except that the addition of MAO was omitted. After 20.0 minutes from its commencement, the polymerization was immediately terminated by diluting the polymerization mixture with 1360 g of hexane and dropping the batch to 3 gallons of isopropanol containing 5 g of 2,6-di-tert-butyl-4-methylphenol. The coagulated polymer was drum-dried. The yield of the polymer was 44.9 g (3.4% conversion). The resulting polymer had the following properties: ML$_{1+4}$=26.8, M$_n$=71,000, M$_w$=499,000, M$_w$/M$_n$=7.0, cis 1,4-linkage content=99.0%, trans 1,4-linkage content=0.6%, and 1,2-linkage content=0.4%.

Comparing Example 7 in Table 3 to Comparative Example 14 in Table 4, MAO is necessary for a polymerization to occur with a conversion over 10%, cis 1,4-linkage content above 99.0%, and a narrow molecular weight distribution.

TABLE 3

Comparing Bulk Polymerizations Conducted with and without n-Bu$_2$O.

| | Example | | | | | |
|---|---|---|---|---|---|---|
| | 7 | 8 | 9 | 10 | 11 | 12 |
| Nd/100 g Bd (mmol) | 0.006 | 0.006 | 0.006 | 0.006 | 0.006 | 0.006 |
| NdV/MAO/DIBAH/halide | 1/100/35/1 | 1/100/36/1 | 1/100/36/2 | 1/100/36/2 | 1/100/44/1 | 1/100/44/1 |
| Bu$_2$O/Nd | 40/1 | 0/1 | 40/1 | 0/1 | 40/1 | 0/1 |
| Halide | CBr$_4$ | CBr$_4$ | t-BuBr | t-BuBr | Br$_2$ | Br$_2$ |
| Gel Formation | no | no | no | yes | no | yes |
| Percent Conversion | 12.1 | 12.6 | 10.3 | 4.6 | 12.3 | 5.1 |
| ML$_{1+4}$ | 14.9 | 15.2 | 29.9 | 8.0 | 23.9 | 3.7 |
| Mn (kg/mol) | 117 | 127 | 132 | 84 | 132 | 71 |
| Mw (kg/mol) | 213 | 179 | 269 | 157 | 235 | 127 |
| MWD | 1.8 | 1.4 | 2.0 | 1.9 | 1.8 | 1.8 |
| % Cis | 99.1 | 98.3 | 99.3 | 98.5 | 99.2 | 98.4 |
| % Trans | 0.7 | 1.5 | 0.6 | 1.3 | 0.7 | 1.3 |
| % Vinyl | 0.2 | 0.2 | 0.1 | 0.2 | 0.1 | 0.3 |

Example 15

Comparative Example

The same procedure as used in Example 9 was used except that the addition of DIBAH was omitted. After 20.0 minutes from its commencement, the polymerization reaction was terminated by diluting the polymerization mixture with 1360 g of hexane and dropping the batch to 3 gallons of isopropanol containing 5 g of 2,6-di-tert-butyl-4-methylphenol. No polymer product was present in the mixture. Comparing Example 9 in Table 3 to Comparative Example 15 in Table 4, an organoaluminum compound (e.g., DIBAH) other than an aluminoxane is necessary for a polymerization to occur.

Example 16

Comparative Example

The same procedure as used in Example 9 was used except that the addition of MAO was omitted. After 20.0 minutes from its commencement, the polymerization reaction was terminated by diluting the polymerization mixture with 1360 g of hexane and dropping the batch to 3 gallons of isopropanol containing 5 g of 2,6-di-tert-butyl-4-methylphenol. A polymer was not isolated from the polymerization reaction. Comparing Example 9 in Table 3 to Comparative Example 16 in Table 4, MAO is necessary for a polymerization to occur.

Example 17

Comparative Example

The same procedure as used in Example 11 was used except that the addition of DIBAH was omitted. After 20.0 minutes from its commencement, the polymerization reaction was terminated by diluting the polymerization mixture with 1360 g of hexane and dropping the batch to 3 gallons of isopropanol containing 5 g of 2,6-di-tert-butyl-4-methylphenol. No polymer product was present in the mixture. Comparing Example 11 in Table 3 to Comparative Example 17 in Table 4, an organoaluminum compound (e.g., DIBAH) other than an aluminoxane is necessary for a polymerization to occur.

Example 18

Comparative Example

The same procedure as used in Example 11 was used except that the addition of MAO was omitted. After 20.0 minutes from its commencement, the polymerization was immediately terminated by diluting the polymerization mixture with 1360 g of hexane and dropping the batch to 3 gallons of isopropanol containing 5 g of 2,6-di-tert-butyl-4-methylphenol. The coagulated polymer was drum-dried. The yield of the polymer was 3.4 g (0.3% conversion). The resulting polymer had the following properties: $ML_{1+4}$=appeared to be very low and was not measured, $M_n$=72,000, $M_w$=484,000, $M_w/M_n$=6.7, cis 1,4-linkage content=99.0%, trans 1,4-linkage content=0.5%, and 1,2-linkage content=0.5%.

TABLE 4

Comparing Bulk Polymerizations Conducted with and without MAO and DIBAH.

|  | Example | | | | | |
| --- | --- | --- | --- | --- | --- | --- |
|  | 13 | 14 | 15 | 16 | 17 | 18 |
| Nd/100 g Bd (mmol) | 0.006 | 0.006 | 0.006 | 0.006 | 0.006 | 0.006 |
| NdV/MAO/DIBAH/halide | 1/100/0/1 | 1/0/36/1 | 1/100/0/2 | 1/0/36/2 | 1/100/0/1 | 1/0/44/1 |
| $Bu_2O/Nd$ | 40/1 | 40/1 | 40/1 | 40/1 | 40/1 | 40/1 |
| Halide | $CBr_4$ | $CBr_4$ | t-BuBr | t-BuBr | $Br_2$ | $Br_2$ |
| Gel Formation | no | no | no | no | no | no |
| Percent Conversion | 0.0 | 3.4 | 0.0 | 0.0 | 0.0 | 0.3 |
| $ML_{1+4}$ | — | 26.8 | — | — | — | very low |
| Mn (kg/mol) | — | 71 | — | — | — | 72 |
| Mw (kg/mol) | — | 499 | — | — | — | 484 |
| MWD | — | 7.0 | — | — | — | 6.7 |
| % Cis | — | 99.0 | — | — | — | 99.0 |
| % Trans | — | 0.6 | — | — | — | 0.5 |
| % Vinyl | — | 0.4 | — | — | — | 0.5 |

Comparing Example 11 in Table 3 to Comparative Example 18 in Table 4, MAO is necessary for a polymerization to occur with a conversion over 10%, cis 1,4-linkage content above 99.0%, and a narrow molecular weight distribution.

Example 19

The same procedure as used in Example 1 was used except that 4.7 ml of a premixed 0.0083 M carbon tetrabromide and 0.011 M iodoform ($CHI_3$) in hexane solution was added instead of $CBr_4$. After 4.0 minutes from its commencement, the polymerization was terminated by diluting the polymerization mixture with 1360 g of hexane and dropping the batch to 3 gallons of isopropanol containing 5 g of 2,6-di-tert-butyl-4-methylphenol. The coagulated polymer was drum-dried. The yield of the polymer was 165.0 g (12.7% conversion). The resulting polymer had the following properties: $ML_{1+4}$=22.3, $M_n$=128,000, $M_w$=219,000, $M_w/M_n$=1.7, cis 1,4-linkage content=99.1%, trans 1,4-linkage content=0.7%, and 1,2-linkage content=0.2%.

Example 20

Comparative Example

The same procedure as used in Example 1 was used except that 2.81 ml of 1.0 M DIBAH in hexane was added. After 2.8 minutes from its commencement, the polymerization was terminated by diluting the polymerization mixture with 1360 g of hexane and dropping the batch to 3 gallons of isopropanol containing 5 g of 2,6-di-tert-butyl-4-methylphenol. The coagulated polymer was drum-dried. The yield of the polymer was 130.7 g (10.0% conversion). The resulting polymer had the following properties: $ML_{1+4}$=22.1, $M_n$=110,000, $M_w$=269,000, $M_w/M_n$=2.4, cis 1,4-linkage content=99.3%, trans 1,4-linkage content=0.6%, and 1,2-linkage content=0.1%.

Comparing Example 19 to Comparative Example 20 in Table 5, the mixed bromide-iodide catalyst yielded a polymer with cis 1,4-linkage content above 99.0% with a narrower molecular weight distribution than the $CBr_4$ catalyst. The mixed bromide-iodide catalyst had a slower, more desirable rate than the $CBr_4$ catalyst.

Example 21

Comparative Example

The same procedure as used in Example 1 was used except that 2.34 ml of 1.0 M DIBAH in hexane was added followed by the addition 6.24 mL of 0.17 M $CHI_3$ in hexane instead of $CBr_4$. After 5.0 minutes from its commencement, the polymerization was terminated by diluting the polymerization mixture with 1360 g of hexane and dropping the batch to 3 gallons of isopropanol containing 5 g of 2,6-di-tert-butyl-4-methylphenol. The coagulated polymer was drum-dried. The yield of the polymer was 199.4 g (15.4% conversion). The resulting polymer had the following properties: $ML_{1+4}$=19.5, $M_n$=148,000, $M_w$=194,000, $M_w/M_n$=1.3, cis 1,4-linkage content=98.8%, trans 1,4-linkage content=0.9%, and 1,2-linkage content=0.3%.

Comparing Example 19 to Comparative Example 21 in Table 5, the mixed bromide-iodide catalyst yielded a polymer with higher cis 1,4-linkage content (above 99.0%) while maintaining a narrow molecular weight distribution with the slower rate of the $CHI_3$ catalyst.

TABLE 5

Results from the Mixed Bromide and Iodide Catalyst.

| Example | 19 | 20 | 21 |
|---|---|---|---|
| Nd/100 g Bd (mmol) | 0.006 | 0.006 | 0.006 |
| NdV/MAO/DIBAH/Bromide*/Iodide* | 1/100/36/2/2 | 1/100/36/4/0 | 1/100/30/0/4 |
| $Bu_2O/Nd$ | 40/1 | 40/1 | 40/1 |
| Bromide | $CBr_4$ | $CBr_4$ | — |
| Iodide | $CHI_3$ | — | $CHI_3$ |
| Polymerization Rate (g/min) | 41.3 | 46.7 | 39.9 |
| Percent Conversion | 12.7 | 10.0 | 15.4 |
| $ML_{1+4}$ | 22.3 | 22.1 | 19.5 |
| Mn (kg/mol) | 128 | 110 | 148 |
| Mw (kg/mol) | 219 | 269 | 194 |
| MWD | 1.7 | 2.4 | 1.3 |
| % Cis | 99.1 | 99.3 | 98.8 |
| % Trans | 0.7 | 0.6 | 0.9 |
| % Vinyl | 0.2 | 0.1 | 0.3 |

*halide concentration is based on the concentration of Br and I, and not on the concentration of $CBr_4$ or $CHI_3$, respectively.

Various modifications and alterations that do not depart from the scope and spirit of this invention will become apparent to those skilled in the art. This invention is not to be duly limited to the illustrative embodiments set forth herein.

What is claimed is:

1. A process for preparing a polydiene, the process comprising the step of:
    polymerizing conjugated diene monomer in the presence of a dihydrocarbyl ether, where said step of polymerizing takes place within a polymerization mixture that includes less than 20% by weight of organic solvent based on the total weight of the polymerization mixture, and where said step of polymerizing employs a lanthanide-based catalyst system that includes the combination of or reaction product of ingredients including (a) a lanthanide compound, (b) an aluminoxane, (c) an organoaluminum compound other than an aluminoxane, and (d) a bromine-containing compound selected from the group consisting of elemental bromine, bromine-containing mixed halogens, and organic bromides.

2. The process of claim 1, where the dihydrocarbyl ether is defined by the formula R—O—R, where each R is independently a hydrocarbyl group or substituted hydrocarbyl group selected from the group consisting of alkyl, cycloalkyl, substituted cycloalkyl, alkenyl, and cycloalkenyl groups.

3. The process of claim 2, where the organoaluminum compound other than an aluminoxane is defined by the formula $AlR_nX_{3-n}$, where each R, which may be the same or different, is a mono-valent organic group that is attached to the aluminum atom via a carbon atom, where each X, which may be the same or different, is a hydrogen atom, a halogen atom, a carboxylate group, an alkoxide group, or an aryloxide group, and where n is an integer of 1 to 3.

4. The process of claim 2, where the organic bromides include a bromine-carbon bond.

5. The process of claim 4, where the organic bromides are defined by the formula $R_{4-x}CBr_x$, where x is an integer from 1 to 4, and each R is individually selected from the group consisting of a monovalent organic group, a hydrogen atom, and a halogen atom.

6. The process of 5, where each R is individually selected from the group consisting of a hydrocarbyl group and a hydrogen atom.

7. The process of claim 6, where the hydrocarbyl group is selected from the group consisting of alkyl, cycloalkyl, alkenyl, cycloalkenyl, aryl, allyl, aralkyl, alkaryl, and alkynyl groups.

8. The process of claim 2, where the bromine-containing compound is an organic bromide selected from the group consisting of brominated hydrocarbons, acyl bromides, and brominated carboxylic esters.

9. The process of claim 8, where the organic bromide is a brominated hydrocarbon selected from the group consisting of carbon tetrabromide, tribromomethane, bromomethane, dibromomethane, t-butyl bromide, 1-bromopropane, 2-bromopropane, 1,3-dibromopropane, 2,2-dimethyl-1-bromopropane, allyl bromide, benzyl bromide, diphenylmethyl bromide, triphenylmethyl bromide, bromobenzene, and benzylidene bromide.

10. The process of claim 8, where the organic bromide is an acyl bromide selected from the group consisting of formyl bromide, acetyl bromide, propionyl bromide, butyryl bromide, isobutyryl bromide, valeroyl bromide, isovaleryl bromide, hexanoyl bromide, and benzoyl bromide.

11. The process of claim 8, where the organic bromide is a brominated carboxylic ester selected from the group consisting of methyl bromoformate, methyl bromoacetate, methyl 2-bromopropionate, methyl 3-bromopropionate, methyl 2-bromobutyrate, methyl 2-bromohexanoate, methyl 4-bromocrotonate, methyl 2-bromobenzoate, methyl 3-bromobenzoate, and methyl 4-bromobenzoate.

12. The process of claim 2, where the bromine-containing compound is elemental bromine.

13. The process of claim 2, where the bromine-containing compound is a bromine-containing mixed halogen selected from the group consisting of bromine monofluoride, bromine trifluoride, bromine pentafluoride, bromine monochloride, and iodine monobromide.

14. The process of claim 2, where the lanthanide-based catalyst system includes the combination of or reaction product of ingredients including the lanthanide compound, the aluminoxane, the organoaluminum compound other than an aluminoxane, the bromine-containing compound, and an iodine-containing compound.

15. The process of claim 14, where the iodine-containing compound is selected from the group consisting of elemental iodine, iodine-containing mixed halogens, hydrogen iodide, organic iodides, inorganic iodides, metallic iodides, and organometallic iodides.

16. The process of claim 14, where the iodine-containing compound is an iodine-containing mixed halogen selected from the group consisting of iodine monochloride, iodine monobromide, iodine trichloride, iodine pentafluoride, iodine monofluoride, and iodine triflouride.

17. The process of claim 14, where the iodine-containing compound is an organic iodide selected from the group consisting of iodomethane, diiodomethane, triiodomethane, tetraiodomethane, 1-iodopropane, 2-iodopropane, 1,3-diiodopropane, t-butyl iodide, 2,2-dimethyl-1-iodopropane, allyl iodide, iodobenzene, benzyl iodide, diphenylmethyl iodide, triphenylmethyl iodide, benzylidene iodide, trimethylsilyl iodide, triethylsilyl iodide, triphenylsilyl iodide, dimethyldiiodosilane, diethyldiiodosilane, diphenyldiiodosilane, methyltriiodosilane, ethyltriiodosilane, phenyltriiodosilane, benzoyl iodide, propionyl iodide, and methyl iodoformate.

18. The process of claim 14, where the iodine-containing compound is an inorganic iodide selected from the group consisting of silicon tetraiodide, arsenic triiodide, tellurium tetraiodide, boron triiodide, phosphorus triiodide, phosphorus oxyiodide and selenium tetraiodide.

19. The process of claim 14, where the iodine-containing compound is a metallic iodide selected from the group consisting of aluminum triiodide, gallium triiodide, indium triiodide, titanium tetraiodide, zinc diiodide, germanium tetraiodide, tin tetraiodide, tin diiodide, antimony triiodide, and magnesium diiodide.

20. The process of claim 14, where the iodine-containing compound is an organometallic iodide selected from the group consisting of methylmagnesium iodide, dimethylaluminum iodide, diethylaluminum iodide, di-n-butylaluminum iodide, diisobutylaluminum iodide, di-n-octylaluminum iodide, methylaluminum diiodide, ethylaluminum diiodide, n-butylaluminum diiodide, isobutylaluminum diiodide, methylaluminum sesquiiodide, ethylaluminum sesquiiodide, isobutylaluminum sesquiiodide, ethylmagnesium iodide, n-butylmagnesium iodide, isobutylmagnesium iodide, phenylmagnesium iodide, benzylmagnesium iodide, trimethyltin iodide, triethyltin iodide, tri-n-butyltin iodide, di-n-butyltin diiodide, and di-t-butyltin diiodide.

21. The process of claim 2, where the molar ratio of the aluminoxane to the lanthanide compound is from about 5:1 to about 1000:1, the molar ratio of the organoaluminum compound other than an aluminoxane to the lanthanide compound is from about 1:1 to about 200:1, the molar ratio of the bromine-containing compound to the lanthanide compound is from about 0.5:1 to about 20:1, and the molar ratio of the dihydrocarbyl ether to the lanthanide compound is from about 0.5:1 to about 1000:1.

22. The process of claim 14, where the molar ratio of iodine atoms in the iodine-containing compounds to bromine atoms in the bromine-containing compounds is from about 0.1:1 to about 10:1.

23. The process of claim 2, where the conjugated diene monomer is selected from the group consisting of 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene.

24. The process of claim 2, where said step of polymerizing takes place within a polymerization mixture that is substantially devoid of organic solvent.

25. A process for preparing a polydiene, the process comprising the step of:
   introducing conjugated diene monomer with a lanthanide-based catalyst system in the presence of less than about 20% by weight organic solvent based on the total weight of the polymerization mixture, where the lanthanide-based catalyst system includes the combination of or reaction product of ingredients including (a) a lanthanide compound, (b) an aluminoxane, (c) an organoaluminum compound other than an aluminoxane, (d) a bromine-containing compound selected from the group consisting of elemental bromine, bromine-containing mixed halogens, and organic bromides, and (e) a dihydrocarbyl ether, to thereby produce a polydiene having a cis-1,4 linkage content in excess of 99%.

26. The process of claim 25, where the lanthanide-based catalyst system includes the combination of or reaction product of ingredients including the lanthanide compound, the aluminoxane, the organoaluminum compound other than an aluminoxane, the bromine-containing compound, and an iodine-containing compound.

27. The process of claim 25, where the bromine-containing compound is an organic bromide selected from the group consisting of brominated hydrocarbons, acyl bromides, and brominated carboxylic esters.

28. The process of claim 27, where the organic bromide is a brominated hydrocarbon selected from the group consisting of carbon tetrabromide, tribromomethane, bromomethane, dibromomethane, t-butyl bromide, 1-bromopropane, 2-bromopropane, 1,3-dibromopropane, 2,2-dimethyl-1-bromopropane, allyl bromide, benzyl bromide, diphenylmethyl bromide, triphenylmethyl bromide, bromobenzene, and benzylidene bromide.

29. The process of claim 27, where the organic bromide is an acyl bromide selected from the group consisting of formyl bromide, acetyl bromide, propionyl bromide, butyryl bromide, isobutyryl bromide, valeroyl bromide, isovaleryl bromide, hexanoyl bromide, and benzoyl bromide.

30. The process of claim 27, where the organic bromide is a brominated carboxylic ester selected from the group consisting of methyl bromoformate, methyl bromoacetate, methyl 2-bromopropionate, methyl 3-bromopropionate, methyl 2-bromobutyrate, methyl 2-bromohexanoate, methyl 4-bromocrotonate, methyl 2-bromobenzoate, methyl 3-bromobenzoate, and methyl 4-bromobenzoate.

31. The process of claim 25, where the molar ratio of the aluminoxane to the lanthanide compound is from about 5:1 to about 1000:1, the molar ratio of the organoaluminum compound other than an aluminoxane to the lanthanide compound is from about 1:1 to about 200:1, the molar ratio of the bromine-containing compound to the lanthanide compound is from about 0.5:1 to about 20:1, and the molar ratio of the dihydrocarbyl ether to the lanthanide compound is from about 0.5:1 to about 1000:1.

32. The process of claim 25, where the conjugated diene monomer is selected from the group consisting of 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene.

33. A process for preparing a polydiene, the process comprising the step of introducing (a) a lanthanide compound, (b) an aluminoxane, (c) an organoaluminum compound other than an aluminoxane, (d) a bromine-containing compound selected from the group consisting of elemental bromine, bromine-containing mixed halogens, hydrogen bromide, and organic bromides, (e) a dihydrocarbyl ether, and (f) conjugated diene monomer, where said step of introducing forms a polymerization mixture that includes less than 20% by weight of solvent based on the total weight of the polymerization mixture, and where the dihydrocarbyl ether is defined by the formula R—O—R, where each R is independently a hydrocarbyl group or substituted hydrocarbyl group selected from the group consisting of alkyl, cycloalkyl, substituted cycloalkyl, alkenyl, and cycloalkenyl groups.

34. The process of claim 33, where said step of introducing further includes introducing an iodine-containing compound.

35. The process of claim 33, where the bromine-containing compound is an organic bromide selected from the group consisting of brominated hydrocarbons, acyl bromides, and brominated carboxylic esters.

36. The process of claim 33, where the organic bromide is a brominated hydrocarbon selected from the group consisting of carbon tetrabromide, tribromomethane, bromomethane, dibromomethane, t-butyl bromide, 1-bromopropane, 2-bromopropane, 1,3-dibromopropane, 2,2-dimethyl-1-bromopropane, allyl bromide, benzyl bromide, diphenylmethyl bromide, triphenylmethyl bromide, bromobenzene, and benzylidene bromide.

37. The process of claim 33, where the organic bromide is an acyl bromide selected from the group consisting of formyl bromide, acetyl bromide, propionyl bromide, butyryl bromide, isobutyryl bromide, valeroyl bromide, isovaleryl bromide, hexanoyl bromide, and benzoyl bromide.

38. The process of claim 33, where the organic bromide is a brominated carboxylic ester selected from the group consisting of methyl bromoformate, methyl bromoacetate, methyl 2-bromopropionate, methyl 3-bromopropionate, methyl 2-bromobutyrate, methyl 2-bromohexanoate, methyl 4-bromocrotonate, methyl 2-bromobenzoate, methyl 3-bromobenzoate, and methyl 4-bromobenzoate.

39. The process of claim 33, where the molar ratio of the aluminoxane to the lanthanide compound is from about 5:1 to about 1000:1, the molar ratio of the organoaluminum compound other than an aluminoxane to the lanthanide compound is from about 1:1 to about 200:1, the molar ratio of the bromine-containing compound to the lanthanide compound is from about 0.5:1 to about 20:1, and the molar ratio of the dihydrocarbyl ether to the lanthanide compound is from about 0.5:1 to about 1000:1.

40. The process of claim 34, where the molar ratio of iodine atoms in the iodine-containing compounds to bromine atoms in the bromine-containing compounds is from about 0.1:1 to about 10:1.

41. The process of claim 33, where said step of polymerizing takes place within a polymerization mixture that is substantially devoid of organic solvent.

42. The process of claim 33, where the conjugated diene monomer is selected from the group consisting of 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene.

43. The process of claim 1, where the dihydrocarbyl ether is selected from the group consisting of dimethyl ether, diethyl ether, di-n-propyl ether, diisopropyl ether, di-n-butyl ether, diisobutyl ether, di-t-butyl ether, di-n-pentyl ether, diisopentyl ether, dineopentyl ether, di-n-hexyl ether, di-n-heptyl ether, di-2-ethylhexyl ether, di-n-octyl ether, di-n-nonyl ether, di-n-decyl ether, and dibenzyl ether.

44. The process of claim 43, where the dihydrocarbyl ether is selected from the group consisting of dimethyl ether, diethyl ether, di-n-propyl ether, diisopropyl ether, di-n-butyl ether, diisobutyl ether, di-t-butyl ether, di-n-pentyl ether, diisopentyl ether, dineopentyl ether, di-n-hexyl ether, di-n-heptyl ether, di-2-ethylhexyl ether, di-n-octyl ether, di-n-nonyl ether, and di-n-decyl ether.

* * * * *